(12) United States Patent
Kim

(10) Patent No.: US 12,553,112 B2
(45) Date of Patent: Feb. 17, 2026

(54) HIGH-STRENGTH BLACKPLATE AND MANUFACTURING METHOD THEREFOR

(71) Applicant: POSCO, Pohang-si (KR)

(72) Inventor: Jai-Ik Kim, Pohang-si (KR)

(73) Assignee: POSCO, Pohang-si (KR)

( * ) Notice: Subject to any disclaimer, the term of this patent is extended or adjusted under 35 U.S.C. 154(b) by 833 days.

(21) Appl. No.: 17/784,452

(22) PCT Filed: Dec. 16, 2020

(86) PCT No.: PCT/KR2020/018453
§ 371 (c)(1),
(2) Date: Jun. 10, 2022

(87) PCT Pub. No.: WO2021/125789
PCT Pub. Date: Jun. 24, 2021

(65) Prior Publication Data
US 2023/0017796 A1   Jan. 19, 2023

(30) Foreign Application Priority Data
Dec. 20, 2019   (KR) .................. 10-2019-0171866

(51) Int. Cl.
| | |
|---|---|
| *C22C 38/04* | (2006.01) |
| *C21D 8/0221* | (2026.01) |
| *C21D 8/0247* | (2026.01) |
| *C21D 9/00* | (2006.01) |
| *C22C 38/00* | (2006.01) |
| *C22C 38/06* | (2006.01) |
| *C22C 38/42* | (2006.01) |
| *C22C 38/50* | (2006.01) |
| *C22C 38/54* | (2006.01) |

(52) U.S. Cl.
CPC ............ *C22C 38/04* (2013.01); *C21D 8/0226* (2013.01); *C21D 8/0236* (2013.01); *C21D 8/0273* (2013.01); *C21D 9/0081* (2013.01); *C22C 38/001* (2013.01); *C22C 38/002* (2013.01); *C22C 38/06* (2013.01); *C22C 38/42* (2013.01); *C22C 38/50* (2013.01); *C22C 38/54* (2013.01)

(58) Field of Classification Search
CPC .................................................. C22C 38/04
See application file for complete search history.

(56) References Cited

U.S. PATENT DOCUMENTS

| | | | | |
|---|---|---|---|---|
| 5,413,645 | A | * 5/1995 | Saunders .................. | B21B 1/28 72/46 |
| 6,042,952 | A | 3/2000 | Aratani et al. | |
| 2020/0010920 | A1 | * 1/2020 | Ueno .................. | C21D 8/0426 |

FOREIGN PATENT DOCUMENTS

| | | |
|---|---|---|
| CN | 1193293 A | 9/1998 |
| CN | 102286688 A | 12/2011 |
| CN | 115135795 B | 11/2013 |
| CN | 105648331 A | 6/2016 |
| CN | 105803337 A | 7/2016 |
| CN | 106086643 A | 11/2016 |
| CN | 109423577 A | 3/2019 |
| FR | 1389693 A | 2/1965 |
| JP | S50-010688 B | 4/1975 |
| JP | H09-327702 A | 12/1997 |
| JP | H10-251799 A | 9/1998 |
| JP | 2000-160289 A | 6/2000 |
| JP | 2002-239646 A | 8/2002 |
| JP | 2002-294399 A | 10/2002 |
| JP | 4284815 B2 | 4/2009 |
| JP | 2010-255021 A | 11/2010 |
| JP | 2015-193892 A | 11/2015 |
| JP | 3769914 B2 | 2/2016 |
| KR | 10-1999-0014807 A | 2/1999 |
| KR | 10-2000-0034959 A | 6/2000 |
| KR | 10-2008-0106330 A | 12/2008 |
| KR | 10-2009-0007783 A | 1/2009 |
| KR | 10-0910467 B1 | 8/2009 |
| KR | 10-2015-0075276 A | 7/2015 |
| KR | 10-2016-0052867 A | 5/2016 |
| KR | 10-1808431 A | 12/2017 |
| TW | I522480 B | 2/2016 |
| WO | 2019-042268 A1 | 3/2019 |

OTHER PUBLICATIONS

International Search Report dated May 11, 2021 issued in International Patent Application No. PCT/KR2020/018453 (with English translation).
K. Maruoka, et al., "C.A.P.L. for tinplate Production of can-making steel using continuous annealing," Steel Times Interntional, Technology Collection, May 1992, No. 16, vol. 3, pp. 1-4.
Chinese Office Action dated Feb. 16, 2023 issued in Chinese Patent Application No. 202080097200.7.
Japanese Office Action dated Sep. 5, 2023 issued in Japanese Patent Application No. 2022-538251.
Chinese Office Action dated Sep. 21, 2023 issued in Chinese Patent Application No. 202080097200.7.

* cited by examiner

*Primary Examiner* — Christopher S Kessler
(74) *Attorney, Agent, or Firm* — Morgan Lewis & Bockius LLP

(57) ABSTRACT

The present invention provides a high-strength tin blackplate and a manufacturing method therefor.
The tin blackplate according to an exemplary embodiment of the present invention includes: by wt %, 0.03 to 0.09% of carbon (C); 0.2 to 0.4% of manganese (Mn); 0.01 to 0.06% of aluminum (Al); 0.15 to 0.45% of chromium (Cr); 0.05 to 0.25% of copper (Cu); 0.03 to 0.08% of titanium (Ti); and the balance of iron (Fe) and inevitable impurities, and has a yield strength of 570 to 700 MPa.

6 Claims, No Drawings

HIGH-STRENGTH BLACKPLATE AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/018453, filed on Dec. 16, 2020, which in turn claims the benefit of Korean Application No. 10-2019-0171866, filed on Dec. 20, 2019, the entire disclosures of which applications are incorporated by reference herein.

TECHNICAL FIELD

The present invention relates to a high-strength tin blackplate and a manufacturing method therefor. More specifically, the present invention relates to a high-strength tin blackplate having excellent workability and pressure resistance characteristics, which is used for a lid (also known as a crown) such as a beverage bottle, and a manufacturing method therefor. Even more specifically, the present invention relates to a high-strength tin blackplate having excellent workability such as drawing for ultra-thin materials, excellent pressure resistance characteristics for contents, and excellent shape fixability by optimizing steel components and manufacturing process, and a manufacturing method therefor.

BACKGROUND ART

Surface-treated blackplates are subjected to various platings so as to be suitable for a use thereof in order to impart corrosion resistance or obtain beautiful surface characteristics. The steel plates plated as described above are referred to as surface-treated plated steel plates, and examples thereof include tinplates, galvanized steel plates, zinc-nickel-plated steel plates, and the like.

Although the surface-treated blackplates are variously classified according to the type of plating as described above, basically required characteristics such as formability, pressure resistance property, and shape fixability need to be secured. Since most of the tin plates (TP) tin-plated on tin blackplates (BP), which are steel materials generally used as materials for cans, have a thin material thickness, the tin plates are evaluated by a temper grade measured with Hr30T (a measurement load of 30 kg and an auxiliary load of 3 kg are applied), which is a Rockwell surface hardness, and may be typically classified into soft tin plates with temper grades T1 (Hr30T 49±3), T2 (Hr30T 53±3) and T3 (Hr30T 57±3) and hard tin plates with temper grades T4 (Hr30T 61±3), T5 (Hr30T 65±3) and T6 (Hr30T 70±3), which are manufactured by a primary rolling method. Further, tin plates may be divided into DR7 (Hr30T 71±3), DR8 (Hr30T 73±3), DR9 (Hr30T 76±3) and DR10 (Hr30T 80±3), which are secondary rolled materials whose hardness has been increased by secondary rolling and the like after annealing for the purpose of increasing the strength of a material.

Tin blackplates, which are not tin-plated are also classified in a manner similar to the classification. Of the blackplates manufactured by a rolling method performed once, materials with a temper grade of T3 or less are used for a part where workability is usually required, whereas a material with a temper grade of T4 or more is used for parts requiring properties capable of withstanding internal properties by contents rather than workability, such as can bodies and lids (end and bottom). In particular, secondary rolled blackplates that require both pressure resistance characteristics and workability are widely applied to a use such as lids for beverage bottles (also known as crown caps).

In order to make a can for storing contents using a tin blackplate, tin (Sn) and the like are electroplated on the surface of the blackplate to impart corrosion resistance and cut to a certain size, and then, the blackplate is processed into a circular or square shape for use. Methods of processing a container are classified into a method of processing a container without welding, such as a 2-piece can consisting of two parts of a lid and a body and a method of fastening a body by welding or adhesion, such as a 3-piece can consisting of three parts of a body, an upper lid (end), and the lower lid (bottom).

A pipe manufacturing method without welding is subjected to a method of processing a container by drawing a tin plate or ironing the tin plate after drawing. Meanwhile, the pipe manufacturing method in which welding is performed is generally subjected to a method in which upper and lower lids are processed and attached to a body and a material cut from a disk as the body is joined to the lids into a circle by a resistance welding method such as wire seam welding. Cans that are processed into a circle according to the purpose of the container may be subjected to secondary processing by a processing process called expanding.

For parts such as crowns, which are lid materials that are generally required to have high pressure resistance characteristics, a drawing tip part is formed into a wrinkle shape in order to improve the airtightness after the drawing processing. In this case, when the workability cannot be secured, the wrinkle shape becomes non-uniform, so that a shape defect occurs, and the sealing force of the contents drops at this portion, causing a problem in that the contents leak out. In particular, even when the internal pressure of a bottle is increased by carbon dioxide gas such as beer and carbonated drinks, the crown needs to maintain the sealability without causing leakage. When the workability of a steel plate for crown is low, the pressure resistance strength, which is a characteristic showing this sealability, is insufficient, so that the lid cannot serve as a lid. Further, even though the wrinkle shape is uniform, the pressure resistance cannot be fundamentally secured when the strength of the steel plate is low.

Therefore, in the case of materials used for these uses, not only workability but also pressure resistance characteristics and shape fixability need to be excellent. When the pressure resistance characteristics and shape fixability cannot be secured, not only the sealing force cannot be secured, but also the contents leak out, so that the can cannot be used as a container. Therefore, in a tin-plated steel plate used for crowns and the like, the pressure resistance characteristics and the shape fixability not only need to be improved, but also the tin-plated steel plate is subjected to severe processing, so that workability also needs to be improved.

DISCLOSURE

Technical Problem

The present invention has been made in an effort to provide a high-strength tin blackplate and a method for manufacturing the same. More specifically, the present invention has been made in an effort to provide a high-strength tin blackplate having excellent workability and pressure resistance characteristics, which is used for a lid (also known as a crown) such as a beverage bottle, and a manufacturing method therefor. Even more specifically, the present invention has been made in an effort to provide a high-strength tin blackplate having excellent workability such as drawing for ultra-thin materials, excellent pressure resistance characteristics for contents, and excellent shape fixability by optimizing steel components and manufacturing process, and a manufacturing method therefor.

Technical Solution

The tin blackplate according to an exemplary embodiment of the present invention includes: by wt %, 0.03 to 0.09% of carbon (C); 0.2 to 0.4% of manganese (Mn); 0.01 to 0.06% of aluminum (Al); 0.15 to 0.45% of chromium (Cr); 0.05 to 0.25% of copper (Cu); 0.03 to 0.08% of titanium (Ti); and the balance of iron (Fe) and inevitable impurities, and has a yield strength of 570 to 700 MPa.

The tin blackplate may further include 0.03% or less (except for 0%) of silicon (Si), 0.01 to 0.03% of phosphorus (P), 0.001 to 0.015% of sulfur (S), and 0.003 to 0.009% of nitrogen (N).

The tin blackplate may satisfy the following Formula 1.

$$0.135 \leq ([Ti]*[Al]/[N]) + ([Ti]/[C]) \leq 0.35 \quad \text{[Formula 1]}$$

In this case, in Formula 1, [Ti], [Al], [N], and [C] mean each value obtained by dividing the content (% by weight) of Ti, Al, N, and C in the blackplate by each atomic weight thereof.

The tin blackplate may satisfy the following Formula 2.

$$0.020 \leq [Mn]*[Cu]/[S] \leq 0.095 \quad \text{[Formula 2]}$$

In this case, in Formula 2, [Mn], [Cu], and [S] mean each value obtained by dividing the content (% by weight) of Mn, Cu, and S in the blackplate by each atomic weight thereof.

The tin blackplate may have a surface hardness (Hr30T) of 74 to 80.

The tin blackplate after being treated with tin-melting and baking may have a yield point elongation of less than 1.0%.

The tin blackplate may have an earring rate of less than 1.5%.

The tin blackplate may have a pressure resistance strength of 120 psi or more.

The tin blackplate according to an exemplary embodiment of the present invention includes the tin blackplate and a tin-plated layer(s) located on one or both surfaces of the tin blackplate.

The method for manufacturing a tin blackplate according to an exemplary embodiment of the present invention includes: manufacturing a slab including: by weight, 0.03 to 0.09% of carbon (C), 0.2 to 0.4% of manganese (Mn), 0.01 to 0.06% of aluminum (Al), 0.15 to 0.45% of chromium (Cr), 0.05 to 0.25% of copper (Cu), 0.03 to 0.08% of titanium (Ti), and the balance of iron (Fe) and inevitable impurities; heating the slab; manufacturing a hot-rolled steel plate by hot-rolling the heated slab; winding the hot-rolled steel plate; manufacturing a cold-rolled steel plate by subjecting the wound hot-rolled steel plate to primary cold rolling; annealing the cold-rolled steel plate; and subjecting the annealed cold-rolled steel plate to secondary cold rolling at a rolling reduction ratio of 5 to 20%.

In the manufacturing of the cold-rolled steel plate by subjecting the wound hot-rolled steel plate to primary cold rolling, the rolling reduction ratio may be 80 to 95%.

The method for manufacturing a tin black may satisfy the following Formula 3.

$$5.5 \leq ([Cr]*1.2[Cu]/[C])*(CR_a - 15)*CR_b/(CR_a + CR_b) \leq 17 \quad \text{[Formula 3]}$$

In this case, in Formula 3, [Cr], [Cu], and [C] mean the content (% by weight) of Cr, Cu, and C in the blackplate, respectively, CRa means a primary cold-rolling reduction ratio (%), and CRb means a secondary cold-rolling reduction ratio (%).

A finishing hot-rolling temperature in the manufacturing of the hot-rolled steel plate by hot-rolling the heated slab may be 860 to 930° C.

A winding temperature of the winding of the hot-rolled steel plate may be 560 to 700° C.

An annealing temperature of the annealing of the cold-rolled steel plate may be 640 to 760° C.

Advantageous Effects

The tin blackplate according to the present invention has excellent strength characteristics, pressure resistance characteristics, shape fixability, and workability by controlling appropriate components and optimizing manufacturing processes.

The tin blackplate according to the present invention can improve productivity by controlling appropriate components and optimizing manufacturing processes, and can be used as a steel plate for crowns used in a lid of a container such as a beer bottle, soju bottle, and a carbonated beverage bottle by controlling alloying elements.

The tin blackplate according to an exemplary embodiment of the present invention has excellent strength, shape fixability, earring rate, workability and pressure resistance characteristics by utilizing a low-carbon steel-based steel to control the addition amounts of chromium (Cr), titanium (Ti) and the like and the ratio of alloying elements and optimize the relationship between primary and secondary cold-rolling reduction ratios.

The tin blackplate according to an exemplary embodiment of the present invention can exhibit excellent physical properties when applied to a part requiring earring properties and pressure resistance characteristics, and suppress processing defects during processing, as in a use which is required to secure a fastening force after drawing.

In the tin blackplate according to an exemplary embodiment of the present invention, although it is required to add an essential alloying element based on low-carbon steel instead of ultra-low carbon steel in order to secure the material of a blackplate for secondary rolling, a stable material quality can be secured by adding predetermined amounts of copper (Cu) and chromium (Cr) instead of reducing the addition amount of manganese (Mn) which degrades workability due to a segregation phenomenon when the essential alloying element is contained in an excessive amount.

The tin blackplate according to an exemplary embodiment of the present invention is present as a coarse precipitate, and thus can secure aging resistance and the mass flow of an ultra-thin material by adding titanium (Ti) that immobilizes solid solution nitrogen, solid solution carbon, and the like without suppressing ferrite recrystallization.

The tin blackplate according to an exemplary embodiment of the present invention can secure a combination of suitable strength and workability by optimizing the combination of primary and secondary rolling reduction ratios in order to improve the contradictory characteristics of preventing the material from breaking during processing and securing pressure resistance characteristics.

MODE FOR INVENTION

In the present specification, terms such as first, second and third are used to describe various parts, components, regions, layers and/or sections, but are not limited thereto. These terms are used only to distinguish one part, component, region, layer or section from another part, component, region, layer or section. Thus, a first part, component, region, layer, or section to be described below could be termed a second part, component, region, layer, or section within a range not departing from the scope of the present invention.

When one part "includes" one constituent element in the present specification, unless otherwise specifically described, this does not mean that another constituent element is excluded, but means that another constituent element may be further included.

The terminology used herein is solely for reference to specific exemplary embodiments and is not intended to limit the present invention. The singular forms used herein also include the plural forms unless the phrases do not express the opposite meaning explicitly. As used herein, the meaning of "include" specifies a specific feature, region, integer, step, action, element and/or component, and does not exclude the presence or addition of another feature, region, integer, step, action, element, and/or component.

In the present specification, the term "combination thereof" included in the Markush type expression means a mixture or combination of one or more selected from the group consisting of constituent elements described in the Markush type expression, and means including one or more selected from the group consisting of the above-described constituent elements.

In the present specification, when a part is referred to as being "above" or "on" another part, it may be directly above or on another part or may be accompanied by another part therebetween. In contrast, when one part is referred to as being "directly above" another part, no other part is interposed therebetween.

Although not differently defined, all terms including technical terms and scientific terms used herein have the same meaning as the meaning that is generally understood by a person with ordinary skill in the art to which the present invention pertains. The terms defined in generally used dictionaries are additionally interpreted to have the meaning matched with the related art document and currently disclosed contents, and are not interpreted to have an ideal meaning or a very formal meaning as long as the terms are not defined.

Further, unless otherwise specified, % means wt %, and 1 ppm is 0.0001 wt %.

In an exemplary embodiment of the present invention, further including an additional element means that the additional element is included while replacing iron (Fe) that is the balance by an additional amount of the additional element.

Hereinafter, exemplary embodiments of the present invention will be described in detail with reference to the accompanying drawings such that a person with ordinary skill in the art to which the present invention pertains can easily carry out the present invention. However, the present invention may be implemented in various different forms, and is not limited to the exemplary embodiments described herein.

The tin blackplate according to an exemplary embodiment of the present invention includes: by wt %, 0.03 to 0.09% of carbon (C); 0.2 to 0.4% of manganese (Mn); 0.01 to 0.06% of aluminum (Al); 0.15 to 0.45% of chromium (Cr); 0.05 to 0.25% of copper (Cu); 0.03 to 0.08% of titanium (Ti); and the balance of iron (Fe) and inevitable impurities, and has a yield strength of 570 to 700 MPa.

The tin blackplate may further include 0.03% or less (except for 0%) of silicon (Si), 0.01 to 0.03% of phosphorus (P), 0.001 to 0.015% of sulfur (S), and 0.003 to 0.009% of nitrogen (N).

The tin blackplate may satisfy the following Formula 1.

$$0.135 \leq ([Ti]*[Al]/[N]) + ([Ti]/[C]) \leq 0.35 \qquad \text{[Formula 1]}$$

In this case, in Formula 1, [Ti], [Al], [N], and [C] mean each value obtained by dividing the content (% by weight) of Ti, Al, N, and C in the blackplate by each atomic weight thereof.

The tin blackplate may satisfy the following Formula 2.

$$0.020 \leq [Mn]*[Cu]/[S] \leq 0.095 \qquad \text{[Formula 2]}$$

In this case, in Formula 2, [Mn], [Cu], and [S] mean each value obtained by dividing the content (% by weight) of Mn, Cu, and S in the blackplate by each atomic weight thereof.

Hereinafter, the components of the tin blackplate and the reasons for the limitation of Formulae 1 and 2 will be described.

Carbon (C): 0.03 to 0.09 wt %

Carbon (C) is an element added to improve the strength of steel, and when the content of C is too small, the above-described effects are insufficient, so that the target pressure resistance characteristics cannot be obtained. In contrast, when the content of C is too high, not only the surface defects are increased, but also supersaturated solid solution carbon is increased, so that the yield point elongation of the material is high, which causes the generation of processing defects such as stretcher strain during processing. In addition, the C content that is too high acts as a factor that degrades the drawing workability, so the content of C may be 0.03 to 0.09%. More specifically, the content of C may be 0.035 to 0.085%.

Manganese (Mn): 0.2 to 0.4 wt %

Manganese (Mn) is a solid solution strengthening element, and serves to increase the strength of steel and improve hot workability. When the content of Mn is too low, it may cause red shortness and it may be difficult to contribute to the stabilization of austenite. In contrast, when the content of Mn is too high, a large amount of manganese-sulfide (MnS) precipitates are formed, so that there are problems in that the ductility and workability of steel deteriorate, the too high content of Mn serves as a factor of center segregation, and degrades rollability. Accordingly, the content of Mn may be 0.2 to 0.4%. More specifically, the content of Mn may be 0.22 to 0.38%.

Aluminum (Al): 0.01 to 0.06 wt %

Aluminum (Al) is an element added for the purpose of preventing a material from deteriorating by a deoxidizer and aging in an aluminum killed steel, and is also effective for securing ductility, and such an effect is more remarkable than at extremely low temperature. In contrast, when the content of Al is too high, surface inclusions such as aluminum-oxide ($Al_2O_3$) are rapidly increased, so that there may occur a problem in that the surface characteristics of a hot-rolled material deteriorate and the workability deteriorates. Accordingly, the content of Al may be 0.01 to 0.06%. More specifically, the content of Al may be 0.015 to 0.055%.

Chromium (Cr): 0.15 to 0.45 wt %

Chromium (Cr) is an element added for solid solution strengthening, and has problems in that when the content of chromium is too low, it is difficult to obtain the strengthening effect, and when chromium is added in too large an amount, it is advantageous in terms of increasing hardness, but corrosion resistance deteriorates and the manufacturing costs are increased due to the use of expensive chromium.

Accordingly, the content of Cr may be 0.15 to 0.45%. More specifically, the content of Cr may be 0.18 to 0.43%.

Copper (Cu): 0.05 to 0.25 wt %

Copper (Cu) is an element added for corrosion resistance and solid solution strengthening, and has problems in that when copper is added in too small an amount, it is difficult to obtain the target effect, and when copper is added in too large an amount, copper induces surface defects during continuous casting and acts as a cause of low temperature cracks at high temperature. Accordingly, the content of Cu may be 0.05 to 0.25%. More specifically, the content of Cu may be 0.06 to 0.23%.

Titanium (Ti): 0.03 to 0.08 wt %

Special element-free low carbon steel has problems in that defects such as stretcher strain or fluting during processing of a can are generated by causing a deformation aging in the reflow of the plating process and the baking treatment procedure of the pipe manufacturing process by elements present in a solid solution state in steel. In order to prevent this problem, titanium (Ti) added as a carbon nitride-forming element is present as a relatively coarse precipitate by controlling the addition amount, and thus does not significantly suppress recrystallization and also serves to promote the improvement of the workability and the improvement of pressure resistance characteristics by immobilizing nitrogen in steel. For this purpose, Ti needs to be added in an amount of 0.03% or more, and when too much Ti is added, there is a problem in that the annealing mass flow of an ultra-thin material deteriorates. Accordingly, the content of Ti may be 0.03 to 0.08%. More specifically, the content of Ti may be 0.032 to 0.076%.

Silicon (Si): 0.03 wt % or Less (Except for 0%)

Silicon (Si) not only may serve as a factor which degrades the surface characteristics and reduce corrosion resistance by combining with oxygen to form an oxide layer on the surface of a steel plate, but also serves as a factor which degrades plating adhesion. Accordingly, the content of Si is limited to 0.03% or less. More specifically, the content of Si may be 0.001 to 0.028%.

Phosphorus (P): 0.01 to 0.03 wt %

Phosphorus (P) is an effective element which improves strength and hardness relatively inexpensive by causing solid solution strengthening while being present as a solid solution element in steel. When the content of P is too low, it is difficult to maintain rigidity, so that it is difficult to secure pressure resistance characteristics, whereas when the amount of P is too high, center segregation occurs during casting, ductility deteriorates, and as a result, the workability may deteriorate. Accordingly, the content of P may be 0.01 to 0.03%. More specifically, the content of P may be 0.013 to 0.028%.

Sulfur (S): 0.001 to 0.015 wt %

Since sulfur combines with manganese in steel to form non-metal inclusions and cause red shortness and also combines with titanium to form precipitates, unless the content of sulfur is strictly controlled, the amount of expensive manganese and titanium added is significantly changed, so that the content range of sulfur needs to be kept at a low level by a certain part because not only a material deviation occurs, but also sulfur acts as a factor to increase manufacturing costs. Further, when the content of S is high, there may be a problem of reducing the base material toughness of the steel plate, so that the content of S may be 0.001 to 0.015%. More specifically, the content of S may be 0.003 to 0.014%.

Nitrogen (N): 0.003 to 0.009 wt %

Nitrogen (N) is an element that is effective for strengthening materials, such as increasing hardness while being present in a solid solution state in steel. When N is included in too small an amount, it is difficult to secure a target rigidity, so that target pressure resistance characteristics cannot be obtained. In contrast, when the content of N is too large, not only rollability deteriorates, but also aging resistance deteriorates sharply, so that workability deteriorates, and N also reacts with titanium and the like to form a precipitate, and thus may act as a factor for an increase in the annealing temperature. Accordingly, the content of N may be 0.003 to 0.009%. More specifically, the content of N may be 0.0034 to 0.0086%.

Meanwhile, in the tin blackplate of the present invention, the value of Formula 1 ([Ti]*[Al]/[N])+([Ti]/[C]) may satisfy 0.135 to 0.35, and the value of Formula 2 [Mn]*[Cu]/[S] may satisfy 0.020 to 0.095. Here, [Ti], [Al], [N], [C], [Mn], [Cu], and [S] are the contents of Ti, Al, N, C, Mn, Cu, and S, respectively, and show a value obtained by dividing the wt % by each atomic weight thereof.

$$0.135 \leq ([Ti]*[Al]/[N])+([Ti]/[C]) \leq 0.35 \quad \text{[Formula 1]}$$

Meanwhile, since titanium acting as a carbon nitride-forming element forms carbides, nitrides, and the like in addition to sulfur, workability, weldability, and the like may be secured only by controlling the amount of titanium added along with the amount of carbon and nitrogen. In order to stably produce a tin blackplate having excellent weldability and workability, the ([Ti]*[Al]/[N])+([Ti]/[C]) atomic ratio may need to be controlled. When the ([Ti]*[Al]/[N])+([Ti]/[C]) atomic ratio is too low, an aging phenomenon occurs in the tin-melting and baking process, and thus acts as a factor that remarkably degrades workability. In contrast, when the ([Ti]*[Al]/[N])+([Ti]/[C]) atomic ratio is too high, the recrystallization phenomenon is remarkably suppressed, so that the heat treatment workability of the ultra-thin material deteriorates, leading to fatal defects such as heat buckle. Accordingly, the ([Ti]*[Al]/[N])+([Ti]/[C]) atomic ratio may be 0.135 to 0.35. More specifically, the ([Ti]*[Al]/[N])+([Ti]/[C]) atomic ratio may be 0.137 to 0.348.

$$0.020 \leq [Mn]*[Cu]/[S] \leq 0.095 \quad \text{[Formula 2]}$$

The content may be adjusted such that the atomic ratio [Mn]*[Cu]/[S] of sulfur to manganese and copper among the elements contained as described above is in a range of 0.020 to 0.095. There were problems in that when the atomic ratio of sulfur to manganese and copper was too small, red shortness was generated and workability deteriorated, and when the atomic ratio was too high, segregation and surface defects were increased. Accordingly, the [Mn]*[Cu]/[S] atomic ratio may be 0.020 to 0.095. More specifically, the [Mn]*[Cu]/[S] atomic ratio may be 0.023 to 0.093.

The high-strength tin blackplate according to an exemplary embodiment of the present invention may have excellent surface hardness characteristics. More specifically, the high-strength tin blackplate may have a surface hardness (Hr30T) of 74 to 80. A material for crowns is formed into a cup through a drawing die after plating and printing, and the tip of a processed part is processed into a wrinkle shape for fastening. In this case, when the quality of the material is not uniform, the degree of curling of the processed tip is different, and thus may be cause of leakage of contents because there is a problem with the sealability of contents. Therefore, it is required that the surface hardness value of the material has a certain range. By satisfying such physical properties, the material may be preferably applied as a target high-strength tin blackplate for crowns. When the surface hardness is too low, the pressure resistance characteristics of a fastened part after processing cannot be secured, so that a problem of content leakage occurs. In contrast, when the surface hardness is too high, there is a problem in maintaining the shape of a crown part because the drawing processing is not properly performed. More specifically, the surface hardness may be 75.5 to 79.5.

In addition, the tin blackplate according to an exemplary embodiment of the present invention has excellent shape fixability after tin-melting and baking. In order to secure the pressure resistance characteristics and shape fixability of a molded crown, the yield strength of the material needs to be controlled within an appropriate range, and specifically, the yield strength is 570 to 700 MPa. When the yield strength is too low, there is a problem in that not only the shape fixability of a processed part after processing deteriorates, but also the pressure resistance characteristic of the fastened part cannot be secured. In contrast, when the yield strength is too high, the drawing process is not performed properly, so that not only there is a problem in maintaining the shape of the crown part, but also there is a problem in that the service life of a processing die is shortened. More specifically, the yield strength may be 570 to 670 MPa. Even more specifically, the yield strength may be 580 to 660 MPa.

In addition, the tin blackplate according to an exemplary embodiment of the present invention may have excellent workability after tin-melting and baking. Specifically, the yield point elongation may be less than 1.0% even after the tin-melting treatment at about 240° C. performed in the tin plating process and the baking treatment in a range of 180 to 220° C. for drying organic materials in the pipe manufacturing process. When the yield point elongation is high, the tin blackplate according to an exemplary embodiment of the present invention is exposed to surface defects such as wrinkles during processing, and there is a problem in that it is difficult to maintain the shape during wrinkle processing, so that the material for crowns needs to be strictly controlled. More specifically, the yield point elongation may be less than 0.8%.

Further, in the tin blackplate according to an exemplary embodiment of the present invention, the anisotropy indicating the height of a cup in each direction by drawing molding may be excellent. The difference in height of the molded cup occurring in the cup drawing process in each direction is a factor that not only has a close correlation with the adhesion of the crown, but also significantly affects the loss of material due to the removal of an earring part. The earring rate, which displays the anisotropy of a molded cup in each direction, shows a value obtained by measuring the height of the molded cup in each direction, and then dividing the difference between the maximum cup height ($H_{max}$) and the minimum cup height ($H_{min}$) by the maximum cup height as a percentage, and is expressed as $(H_{max}-H_{min})/(H_{max})$ *100. The earring rate due to drawing processing may be less than 1.5%. When the earring rate is higher than 1.5%, not only the loss of the material increases, but also the shape defects of the wrinkle processed part at the tip of the molded cup appear, so that there is a problem in that the fastening force of the crown is lowered. Specifically, the earring rate due to drawing processing may be less than 1.5%. More preferably, the earring rate may be less than 1.3%.

In addition, the tin blackplate according to an exemplary embodiment of the present invention may have excellent pressure resistance after tin-melting and baking. Specifically, when a tinplate is processed in the form of a crown and then a pressure resistance test is performed in accordance with JIS S9017, a value of 120 psi or more may be obtained. When the pressure resistance strength is too low, the fastening force of a processed product deteriorates, so that the pressure resistance strength needs to be strictly controlled in terms of securing the stability of a container because the too low pressure resistance strength serves as a factor that causes the contents to leak out. Specifically, the pressure resistance strength may be 120 psi (about 0.828 MPa) or more. More specifically, the pressure resistance strength may be 125 psi (about 0.863 MPa) or more.

Meanwhile, the tin blackplate according to an exemplary embodiment of the present invention includes the tin blackplate and a tin-plated layer(s) located on one or both surfaces of the tin blackplate.

The method for manufacturing a tin blackplate according to an exemplary embodiment of the present invention includes: manufacturing a slab including: by weight, 0.03 to 0.09% of carbon (C), 0.2 to 0.4% of manganese (Mn), 0.01 to 0.06% of aluminum (Al), 0.15 to 0.45% of chromium (Cr), 0.05 to 0.25% of copper (Cu), 0.03 to 0.08% of titanium (Ti), and the balance of iron (Fe) and inevitable impurities; heating the slab; manufacturing a hot-rolled steel plate by hot-rolling the heated slab; winding the hot-rolled steel plate; manufacturing a cold-rolled steel plate by subjecting the wound hot-rolled steel plate to primary cold rolling; annealing the cold-rolled steel plate; and subjecting the annealed cold-rolled steel plate to secondary cold rolling at a rolling reduction ratio of 5 to 20%.

Hereinafter, the method will be specifically described for each step.

First, a slab is manufactured. In the steelmaking step, C, Mn, Si, P, S, Al, N, Ti, Cr, Cu, and the like are controlled with appropriate contents, and a molten steel whose composition is adjusted in the steelmaking is manufactured into a slab through continuous casting.

Since each composition of the slab has been described in detail in the above-described tin blackplate, the duplicate description thereof will be omitted. Since the alloy components are not substantially changed in the tin blackplate manufacturing process, the alloy components of the slab and the finally manufactured tin blackplate may be the same.

Next, the slab is heated. To smoothly perform the subsequent hot rolling process and subject the slab to homogenization treatment, the slab may be heated to 1150 to 1280° C. When the slab heating temperature is too low, there is a problem in that the rollability deteriorates because the load is sharply increased during the subsequent thermal rolling, whereas when the slab heating temperature is too high, not only the energy costs are increased but also the surface scale generation is increased to generate the loss of materials. More preferably, the slab heating temperature may be 1180 to 1250° C.

Next, a hot-rolled steel plate is manufactured by hot-rolling the heated slab. In this case, the finishing hot-rolling temperature may be 860 to 930° C. When the finishing rolling temperature is too low, the crystal grains may be rapidly mixed as the hot rolling in the low-temperature region is finished, thereby leading to deterioration in hot rollability and workability. In contrast, when the finishing rolling temperature is too high, the peelability of the surface scale is lowered, and uniform hot rolling is not performed over the entire thickness, which may cause shape defects. More preferably, the finishing rolling temperature may be 860 to 930° C.

Next, the hot-rolled steel plate is wound. In this case, the winding temperature may be 560 to 700° C. After hot rolling and before winding, the hot-rolled steel plate may be cooled on a run-out table (ROT). When the winding temperature is too low, the temperature inhomogeneity in the width direction causes a difference in the formation behavior of low-temperature precipitates during cooling and maintenance to induce material deviation and adversely affect workability. In contrast, even though the winding temperature is too high, the fine structure becomes coarse, so that there is a problem in that the surface material is softened and defects such as orange-peel are induced during pipe manufacturing. More preferably, the winding temperature may be 570 to 690° C.

After winding the hot-rolled steel plate and before cold-rolling the wound hot-rolled steel plate, the method may further include washing the wound hot-rolled steel plate with an acid.

Next, a cold-rolled steel plate is manufactured by cold-rolling the wound hot-rolled steel plate. In this case, the rolling reduction ratio may be 80 to 95%. When the cold-rolling reduction ratio is too low, the driving force for recrystallization is so low that it is difficult to secure a uniform material such as local structure growth, and further, considering the thickness of a final product, there is a problem in that the hot rolling workability remarkably deteriorates as a whole, for example, the thickness of the hot-rolled plate needs to be made sufficiently thin. In contrast, when the rolling reduction ratio is too high, there is a problem in that the cold rolling workability deteriorates due to an increase in load on a rolling mill. Accordingly, the rolling reduction ratio may be 80 to 95%. More specifically, the rolling reduction ratio may be 85 to 92%.

Next, the cold-rolled steel plate is annealed. By annealing from a state where the strength is increased due to the deformation introduced from cold rolling, the target strength and workability may be secured. In this case, the annealing temperature may be 640 to 760° C. When the annealing temperature is too low, the deformation formed by rolling is not sufficiently removed, so that there is a problem in that the workability is significantly reduced, whereas when the annealing temperature is too high, it is difficult to control the tension in the furnace by high-temperature annealing during continuous annealing, so that there is a problem in that not only the mass flow deteriorates but also defects such as heat buckle during an annealing work are induced. More preferably, the annealing temperature may be 650 to 750° C.

After the annealing of the cold-rolled steel plate, the strength is improved by subjecting the annealed cold-rolled steel plate to secondary cold rolling in the temper-rolling of the annealed cold-rolled steel plate. In the case, the rolling reduction ratio may be 5 to 20%. Through the secondary rolling, not only a desired surface roughness may be obtained, but also an effect of increasing strength due to processing curing may be secured. When a secondary rolling reduction rate that is too high is applied, it is advantageous in terms of securing strength, but there is a problem in that drawing and wrinkle workability remarkably deteriorate, whereas when the rolling reduction ratio is too low, a target strength level may not be obtained, so that the leakage of the contents cannot be prevented because the pressure resistance characteristics cannot be secured. More specifically, the secondary rolling reduction ratio may be 7 to 19%.

Meanwhile, it was confirmed that the workability of a product, particularly the earring rate, in materials manufactured by primary and secondary rollings, as in steel plates for crowns, may satisfy not only a primary rolling reduction ratio ($CR_a$, %) in the primary cold-rolling step after hot rolling and a secondary rolling reduction ratio ($CR_b$, %) in the secondary cold rolling (temper rolling step) after annealing, but also wt % of strengthening elements to be added, Cr, Cu and C, and the following Formula 3.

$$5.5 \leq ([Cr]*1.2[Cu]/[C])*(CR_a-15)*CR_b/(CR_a+CR_b) \leq 17 \quad \text{[Formula 3]}$$

In order to secure excellent workability and reduce the earring rate, it is possible to use the materials of the above-described components and simultaneously manage the relationship between the strengthening elements and the primary and secondary rolling reduction ratios, Formula 3. In this case, the relationship between the strengthening elements and the primary and secondary rolling reduction ratios, $([Cr]*1.2[Cu]/[C])*(CR_a-15)*CR_b/(CR_a+CR_b)$, may be 5.5 to 17. It was confirmed that when a $\Delta r$ value, which is an in-plane anisotropy index obtained by a tensile test through various experiments, has a range of −0.2 to 0.2, there is no big problem in applicability for uses with strict drawing characteristics such as crowns. Based on this, when the relationship formula of Formula 3 between the strengthening elements and the primary and secondary cold rolling reduction ratios is too small in a material for a secondary rolling crown, a plastic deformation ratio in the direction of 45 degrees is increased, so that there is a problem in that the earring rate is increased, whereas when Formula 3 is too large, there is a problem in that as the loading under cold rolling reduction is increased, rollability deteriorates and the height of the cup in a direction of 60 degrees is increased to lower pressure resistance strength, so that a material having excellent workability cannot be secured. More specifically, the value of Formula 3 may be 5.55 to 16.85. In this case, in Formula 3, [Cr], [Cu], and [C] mean the content (% by weight) of Cr, Cu, and C in the blackplate, respectively, $CR_a$ means a primary cold-rolling reduction ratio, and $CR_b$ means a secondary cold-rolling reduction ratio.

Meanwhile, a tin-plated layer may be formed by electroplating tin on one or both sides of the manufactured tin blackplate. A tinplate may be manufactured by forming a tin-plated layer.

Hereinafter, the present invention will be described in more detail through the examples. However, such examples are merely for exemplifying the present invention, and the present invention is not limited thereto.

EXAMPLES

After a slab of an aluminum killed steel configured as shown in the following Table 1 was heated to 1230° C., hot rolling, winding, cold rolling, and continuous annealing were performed under the manufacturing conditions summarized in the following Table 2, and then a tin blackplate to which a temper rolling reduction ratio was applied was obtained.

TABLE 1

| Steel type | Alloy composition (wt %) | | | | | | | | | | Formula 1 | Formula 2 |
| --- | --- | --- | --- | --- | --- | --- | --- | --- | --- | --- | --- | --- |
| | C | Mn | Si | P | S | Al | N | Cr | Cu | Ti | | |
| Inventive Steel 1 | 0.037 | 0.36 | 0.016 | 0.026 | 0.011 | 0.044 | 0.0042 | 0.26 | 0.15 | 0.046 | 0.316 | 0.045 |

TABLE 1-continued

| Steel type | Alloy composition (wt %) | | | | | | | | | | Formula 1 | Formula 2 |
|---|---|---|---|---|---|---|---|---|---|---|---|---|
| | C | Mn | Si | P | S | Al | N | Cr | Cu | Ti | | |
| Inventive Steel 2 | 0.055 | 0.28 | 0.021 | 0.021 | 0.009 | 0.036 | 0.0066 | 0.41 | 0.09 | 0.059 | 0.272 | 0.025 |
| Inventive Steel 3 | 0.062 | 0.37 | 0.006 | 0.016 | 0.008 | 0.051 | 0.0075 | 0.39 | 0.21 | 0.035 | 0.144 | 0.088 |
| Inventive Steel 4 | 0.081 | 0.24 | 0.009 | 0.014 | 0.006 | 0.020 | 0.0039 | 0.21 | 0.18 | 0.064 | 0.201 | 0.065 |
| Comparative Steel 1 | 0.011 | 0.25 | 0.015 | 0.014 | 0.010 | 0.076 | 0.0117 | 0.34 | 0.19 | 0.047 | 1.071 | 0.043 |
| Comparative Steel 2 | 0.024 | 0.42 | 0.011 | 0.025 | 0.052 | 0.026 | 0.0022 | 0.21 | 0.00 | 0.052 | 0.548 | 0.000 |
| Comparative Steel 3 | 0.041 | 0.08 | 0.006 | 0.009 | 0.009 | 0.007 | 0.0045 | 0.08 | 0.01 | 0.018 | 0.110 | 0.001 |
| Comparative Steel 4 | 0.045 | 0.35 | 0.524 | 0.057 | 0.011 | 0.031 | 0.0014 | 0.00 | 0.56 | 0.076 | 0.440 | 0.162 |
| Comparative Steel 5 | 0.071 | 0.86 | 0.012 | 0.022 | 0.021 | 0.001 | 0.0039 | 0.34 | 0.21 | 0.000 | 0.000 | 0.078 |
| Comparative Steel 6 | 0.102 | 0.25 | 0.019 | 0.041 | 0.008 | 0.042 | 0.0059 | 0.58 | 0.11 | 0.046 | 0.116 | 0.031 |

In this case, Formulae 1 and 2 were calculated with the following values.

$$([Ti]*[Al]/[N])+([Ti]/[C]) \quad \text{[Formula 1]}$$

$$[Mn]*[Cu]/[S] \quad \text{[Formula 2]}$$

Here, [Ti] is a value obtained by dividing the content (% by weight) of Ti in the plated steel plate by an atomic weight (48).

[Al] is a value obtained by dividing the content (% by weight) of Al in the plated steel plate by an atomic weight (27).

[N] is a value obtained by dividing the content (% by weight) of N in the plated steel plate by an atomic weight (14).

[C] is a value obtained by dividing the content (% by weight) of C in the plated steel plate by an atomic weight (12).

[Mn] is a value obtained by dividing the content (% by weight) of Mn in the plated steel plate by an atomic weight (55).

[Cu] is a value obtained by dividing the content (% by weight) of Cu in the plated steel plate by an atomic weight (64).

[S] is a value obtained by dividing the content (% by weight) of S in the plated steel plate by an atomic weight (32).

TABLE 2

| Classification | Steel type No. | Finishing hot-rolling temperature (° C.) | Winding temperature (° C.) | Primary cold-rolling reduction ratio ($CR_a$, %) | Annealing temperature (° C.) | Secondary cold-rolling reduction ratio ($CR_b$, %) | Formula 3 |
|---|---|---|---|---|---|---|---|
| Inventive Example 1 | Inventive Steel 1 | 900 | 580 | 88 | 660 | 18 | 15.68 |
| Inventive Example 2 | Inventive Steel 1 | 900 | 580 | 88 | 710 | 15 | 13.45 |
| Inventive Example 3 | Inventive Steel 1 | 900 | 580 | 88 | 740 | 12 | 11.08 |
| Inventive Example 4 | Inventive Steel 2 | 890 | 620 | 86 | 690 | 10 | 5.95 |
| Inventive Example 5 | Inventive Steel 2 | 890 | 620 | 86 | 730 | 16 | 8.97 |
| Inventive Example 6 | Inventive Steel 3 | 910 | 660 | 90 | 680 | 8 | 9.71 |
| Inventive Example 7 | Inventive Steel 4 | 880 | 660 | 91 | 700 | 14 | 5.67 |
| Inventive Example 8 | Inventive Steel 4 | 880 | 660 | 90 | 740 | 18 | 7.00 |
| Comparative Example1 | Inventive Steel 1 | 750 | 580 | 90 | 620 | 34 | 26.01 |
| Comparative Example2 | Inventive Steel 1 | 900 | 580 | 75 | 700 | 29 | 21.16 |
| Comparative Example3 | Inventive Steel 2 | 890 | 460 | 96 | 690 | 4 | 2.61 |
| Comparative Example4 | Inventive Steel 3 | 910 | 780 | 90 | 820 | 26 | 26.65 |
| Comparative Example5 | Comparative Steel 1 | 880 | 640 | 88 | 690 | 8 | 42.87 |
| Comparative Example6 | Comparative Steel 2 | 880 | 640 | 88 | 690 | 16 | 0.00 |

TABLE 2-continued

| Classification | Steel type No. | Finishing hot-rolling temperature (° C.) | Winding temperature (° C.) | Primary cold-rolling reduction ratio (CR$_a$, %) | Annealing temperature (° C.) | Secondary cold-rolling reduction ratio (CR$_b$, %) | Formula 3 |
|---|---|---|---|---|---|---|---|
| Comparative Example7 | Comparative Steel 3 | 880 | 640 | 88 | 690 | 12 | 0.21 |
| Comparative Example8 | Comparative Steel 4 | 880 | 640 | 88 | 690 | 17 | 0.00 |
| Comparative Example9 | Comparative Steel 5 | 880 | 640 | 88 | 690 | 35 | 25.07 |
| Comparative Example10 | Comparative Steel 6 | 880 | 640 | 88 | 690 | 9 | 5.08 |

In this case, Formula 3 was calculated with the following values.

$$([Cr]*1.2[Cu]/[C])*(CR_a-15)*CR_b/(CR_a+CR_b) \quad \text{[Formula 3]}$$

Here, [Cr] means the content (% by weight) of Cr in the plated steel plate.

[Cu] means the content (% by weight) of Cu in the plated steel plate.

[C] means the content (% by weight) of C in the plated steel plate.

CR$_a$ means a primary cold rolling reduction ratio, and CR$_b$ means a secondary cold rolling reduction ratio.

Various characteristics of these tin blackplates were measured, and the results are shown in the following Table 3.

The mass flow was displayed as "0" when there was no rolling load during cold and hot rolling and no defects such as heat buckle during continuous annealing, and was displayed as "X" when a rolling load occurred or defects such as strip breakage occurred during continuous annealing.

Surface hardness values measured with Hr30T with a main load of 30 kg and an auxiliary load of 3 kg using a Rockwell surface hardness device are shown.

A yield strength exhibited an average value measured by conducting three tensile tests per condition on an ASTM13B standard tensile sample with a gauge length of 50 mm.

A yield point elongation is a value obtained by measuring a sample in which a tin blackplate was subjected to a tin-melting heat treatment at 240° C. for 3 seconds and a baking treatment at 200° C. for 20 minutes through a tensile test, and when the value is less than 1%, the sample was indicated as "good, and when the value is 1% or more, the sample was indicated as "poor".

An earring rate is a percentage (($H_{max}-H_{min}$)/($H_{max}$)*100) of a value obtained by measuring a drawing ratio (=blank diameter*100/die diameter) shown as a diameter ratio of a molding die to a blank diameter and the height of a molded cup which is molded to 1.6 in each direction and dividing the difference between the maximum cup height ($H_{max}$) and the minimum cup height ($H_{min}$) by the maximum cup height, and when the earring rate is less than 1.5%, the molded cup was indicated as "good", and when the earring rate is 1.5% or more, the molded cup was indicated as "poor".

Pressure resistance characteristics (pressure resistance strength) were indicated as "good" when a resistance pressure strength obtained by conducting a resistance pressure test in accordance with JIS S9017 was 120 psi or more, and as "poor" when the resistance pressure strength was less than 120 psi.

The workability was indicated as "poor" when fracture or defective shape of the fastening occurred by performing molding using a steel plate, and as "good" when fracture or defective shape did not occur.

TABLE 3

| Classification | Mass flow | Surface hardness (Hr30T) | Yield strength (MPa) | Yield point elongation (%) | Earring rate | Pressure resistance characteristics | Workability |
|---|---|---|---|---|---|---|---|
| Inventive Example 1 | ○ | 77.5 | 637 | Good | Good | Good | Good |
| Inventive Example 2 | ○ | 76.2 | 621 | Good | Good | Good | Good |
| Inventive Example 3 | ○ | 75.9 | 628 | Good | Good | Good | Good |
| Inventive Example 4 | ○ | 76.8 | 614 | Good | Good | Good | Good |
| Inventive Example 5 | ○ | 78.2 | 647 | Good | Good | Good | Good |
| Inventive Example 6 | ○ | 76.8 | 586 | Good | Good | Good | Good |
| Inventive Example 7 | ○ | 77.5 | 609 | Good | Good | Good | Good |
| Inventive Example 8 | ○ | 79.2 | 641 | Good | Good | Good | Good |
| Comparative Example1 | X | 82.4 | 714 | Good | Poor | Good | Poor |
| Comparative Example2 | ○ | 72.5 | 562 | Good | Poor | Poor | Poor |
| Comparative Example3 | X | 69.6 | 548 | Poor | Poor | Poor | Poor |

TABLE 3-continued

| Classification | Mass flow | Surface hardness (Hr30T) | Yield strength (MPa) | Yield point elongation (%) | Earring rate | Pressure resistance characteristics | Workability |
|---|---|---|---|---|---|---|---|
| Comparative Example4 | X | 74.4 | 568 | Good | Poor | Good | Poor |
| Comparative Example5 | ○ | 59.4 | 386 | Poor | Poor | Poor | Poor |
| Comparative Example6 | ○ | 64.9 | 439 | Poor | Poor | Poor | Poor |
| Comparative Example7 | ○ | 61.8 | 418 | Poor | Poor | Poor | Poor |
| Comparative Example8 | ○ | 68.5 | 523 | Poor | Poor | Poor | Poor |
| Comparative Example9 | X | 82.3 | 692 | Poor | Poor | Good | Poor |
| Comparative Example10 | ○ | 66.7 | 510 | Poor | Poor | Poor | Poor |

Table

As can be seen from Tables 1 to 3, in Inventive Examples 1 to 8 that satisfy all of the alloy composition and manufacturing conditions of the present invention, not only mass flow is excellent, but also a surface hardness, Hr30T of 74 to 80, a yield strength of 570 to 670 MPa, a yield point elongation of less than 1.0%, an earring rate of less than 1.5%, and a pressure resistance strength of 120 psi or more, which are target material criteria of a tin blackplate, were obtained, and fracture or defective shape did not occur during processing, so that not only excellent workability could be secured, but also good pressure resistance characteristics could be obtained.

In contrast, in Comparative Examples 1 to 4, the alloy composition presented in the present invention was satisfied, but the manufacturing conditions were not satisfied, there were problems in that primary and secondary rolling mass flows (Comparative Examples 1 and 3) and annealing mass flow (Comparative Example 4) deteriorate, the surface hardness or yield strength was higher (Comparative Example 1) or lower (Comparative Examples 2 to 4) than the target, and the earring rate was as high as 1.5% or more, so that not only was there a large loss of material, but the fastening force was also reduced, and there were cases where the pressure resistance characteristics and workability could not be satisfied, and as a result, the overall target characteristics of the high-strength tin blackplate could not be secured.

Comparative Examples 5 to 8 and 10 are cases where the manufacturing conditions presented in the present invention are satisfied but the alloy composition is not satisfied, and Comparative Example 9 is a case where none of alloy composition and manufacturing conditions are satisfied. Most of Comparative Examples 5 to 10 could not satisfy the target surface hardness, yield strength, yield point elongation, earring rate, pressure resistance characteristics, workability, and the like of the present invention, and Comparative Example 9 could not secure the target characteristics because various problems such as an unsatisfactory mass flow occurred.

The present invention is not limited to the Examples, but may be prepared in various forms, and a person with ordinary skill in the art to which the present invention pertains will understand that the present invention can be implemented in another specific form without changing the technical spirit or essential feature of the present invention. Therefore, it should be understood that the above-described examples are only illustrative in all aspects and not restrictive.

arrangements included within the spirit and scope of the appended claims.

The invention claimed is:

1. A tin blackplate comprising: by wt %, 0.03 to 0.09% of carbon (C); 0.2 to 0.4% of manganese (Mn); 0.01 to 0.06% of aluminum (Al); 0.15 to 0.45% of chromium (Cr); 0.05 to 0.25% of copper (Cu); 0.03 to 0.08% of titanium (Ti); 0.03% or less, except for 0%, of silicon (Si); 0.01 to 0.03% of phosphorus (P); 0.001 to 0.015% of sulfur(S); and 0.003 to 0.009% of nitrogen (N); and the balance of iron (Fe) and inevitable impurities, and having a yield strength of 570 to 700 MPa, wherein the tin blackplate satisfies the following Formulas 1 and 2:

$$0.135 \leq ([Ti]*/[N]) + ([Ti]/[C]) \leq 0.35 \quad \text{[Formula 1]}$$

where in Formula 1, [Ti], [Al], [N], and [C] mean each value obtained by dividing the content, % by weight, of Ti, Al, N, and C, respectively, in the blackplate by each atomic weight thereof, $$0.020 \leq [Mn]*[Cu]/[S] \leq 0.095 \quad \text{[Formula 2]}$$

where in Formula 2, [Mn], [Cu], and [S] mean each value obtained by dividing the content, % by weight, of Mn, Cu, and S, respectively, in the blackplate by each atomic weight thereof.

2. The tin blackplate of claim 1, wherein
the tin blackplate has a surface hardness (Hr30T) of 74 to 80.

3. The tin blackplate of claim 1, wherein
the tin blackplate after being treated with tin-melting and baking has a yield point elongation of less than 1.0%.

4. The tin blackplate of claim 1, wherein
the tin blackplate has an earring rate of less than 1.5%.

5. The tin blackplate of claim 1, wherein
the tin blackplate has a pressure resistance strength of 120 psi or more.

6. A tinplate comprising the tin blackplate described in claim 1 and a tin-plated layer(s) located on one or both surfaces of the tin blackplate.

* * * * *